(12) United States Patent
Lesesky et al.

(10) Patent No.: US 12,061,129 B1
(45) Date of Patent: Aug. 13, 2024

(54) SYSTEM AND METHOD FOR MEASURING, CALCULATING, RECORDING AND REPORTING VEHICLE TIRE PRESSURE USING A PNEUMATIC PISTON-TYPE GAUGE

(71) Applicant: ITIRE, LLC, Rock Hill, SC (US)

(72) Inventors: Alan C. Lesesky, Charlotte, NC (US); Samuel Duke Drinkard, Gaston, SC (US); Ryan D. Parks, Rock Hill, SC (US); Steve R. Osborne, Lancaster, SC (US); Steven A. Osborne, Lancaster, SC (US)

(73) Assignee: ITIRE, LLC, Rock Hill, SC (US)

( * ) Notice: Subject to any disclaimer, the term of this patent is extended or adjusted under 35 U.S.C. 154(b) by 0 days.

(21) Appl. No.: 17/353,205

(22) Filed: Jun. 21, 2021

Related U.S. Application Data

(60) Provisional application No. 63/041,367, filed on Jun. 19, 2020.

(51) Int. Cl.
*G01L 7/16* (2006.01)

(52) U.S. Cl.
CPC .................................. *G01L 7/166* (2013.01)

(58) Field of Classification Search
CPC ..... G01L 11/02; G01L 19/08–12; G01L 7/16; G01L 7/166; G01L 9/0089; G01L 17/00
See application file for complete search history.

(56) References Cited

U.S. PATENT DOCUMENTS

| | | | | |
|---|---|---|---|---|
| 3,949,610 A | * | 4/1976 | Pietsch | G01L 7/08 116/270 |
| 4,693,112 A | * | 9/1987 | Ferris | G01L 17/00 73/756 |
| 4,770,044 A | * | 9/1988 | Ferris | G01L 17/00 116/272 |
| 4,777,828 A | * | 10/1988 | Ferris | G01L 17/00 116/272 |

(Continued)

FOREIGN PATENT DOCUMENTS

| | | | | | |
|---|---|---|---|---|---|
| DE | 102013019610 A1 | * | 5/2015 | ........... | G01L 19/083 |
| GB | 2223845 A | * | 4/1990 | ............. | G01L 17/00 |
| GB | 2298922 A | * | 9/1996 | ............. | G01L 17/00 |

OTHER PUBLICATIONS

McIntosh, J. (Oct. 31, 2019). How it works: Checking tire pressure | driving. Driving. Retrieved Jun. 24, 2022, from https://driving.ca/column/how-it-works/how-it-works-checking-tire-pressure (Year: 2019).*

(Continued)

*Primary Examiner* — Alexander A Mercado
(74) *Attorney, Agent, or Firm* — Schwartz Law Firm, P.C.

(57) ABSTRACT

A handheld pneumatic tire pressure gauge includes a substantially hollow tubular body section having a gauge head at one end and an open end opposite the gauge head. The gauge head is configured to operatively connect to a pneumatic tire. An elongated measurement scale is slidable positioned within the body section and is configured to be forced out of the body section through the open end. The measurement scale extends outwardly though the open end a distance proportional with a measured air pressure. The measurement scale includes a series of rectangular markers spaced apart at intervals and arranged in groups of common hue along its length.

3 Claims, 13 Drawing Sheets

(56) References Cited

U.S. PATENT DOCUMENTS

| | | | | |
|---|---|---|---|---|
| 4,829,829 A * | 5/1989 | Ferris | ............... | G01L 19/0007 |
| | | | | 137/227 |
| 8,573,046 B1 * | 11/2013 | Ohm | ............... | G01L 17/00 |
| | | | | 73/146.3 |
| 2018/0266912 A1 * | 9/2018 | Hayes | ............... | F16L 41/12 |
| 2019/0107455 A1 * | 4/2019 | Wortman | ............... | G01L 19/10 |

OTHER PUBLICATIONS

English translation of DE-102013019610-A1 (Year: 2015).*

* cited by examiner

SYSTEM AND METHOD FOR MEASURING, CALCULATING, RECORDING AND REPORTING VEHICLE TIRE PRESSURE USING A PNEUMATIC PISTON-TYPE GAUGE

BACKGROUND

The measurement of tire pressure using a pneumatic piston-type gauge is the commonly accepted method for ensuring proper tire pressure as part of vehicle inspection. These pneumatic gauges are operated by pressing the head of the gauge onto the tire's mating valve stem. Air flow into the gauge is opposed by an internal spring, and the distance that the gauge's measurement scale is pushed out of the gauge body corresponds with the air pressure of the tire. Record keeping of data collected during vehicle inspections is often deemed too labor intensive due to time spent manually writing down or entering pressure readings onto physical or digital forms. By positioning colored markers along the face of the gauge scale, computer vision analysis can be used to quickly and easily capture the tire pressure readings with the camera of a mobile device such as a tablet or cellular phone and save it to an inspection record.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

According to one exemplary embodiment, the present disclosure comprises a system and method for measuring, calculating, recording and/or reporting tire pressure using a pneumatic piston-type gauge. The exemplary system and method may be implemented using an exemplary mobile computing device, as described below.

Exemplary Mobile Computing Device

In one exemplary embodiment, the present disclosure utilizes a handheld mobile computing device (referred to herein as "mobile device"). The exemplary mobile device may comprise a smartphone using an operating system such as Google's Android, Apple's iOS, Maemo, Bada, Symbian, Windows Phone, Palm, Blackberry, and others. The mobile device may include a high-resolution touchscreen display, a web browser, high-speed data access via Wi-Fi and mobile broadband, and advanced application programming interfaces (APIs) for running third-party applications. The mobile device may also be equipped with NFC, and paired with NFC tags or stickers which can be programmed by NFC apps and other mobile apps on the device. For example, BlackBerry devices support NFC using BlackBerry Tag on a number of devices running BlackBerry OS. Other handheld mobile devices without built-in NFC chips may utilize MicroSD and UICC SIM cards incorporating industry standard contactless smartcard chips with ISO14443 interface, with or without built-in antenna.

The exemplary mobile device may also include card slots for removable or non-removable flash and SIM cards, and may have greater than 32 GB of non-volatile internal memory. One or more of the flash and SIM cards and internal memory may comprise computer-readable storage media containing program instructions applicable for performing one or more steps of a method for calculating, recording and reporting pressure of a vehicle tire.

The SIM card contains an integrated circuit that securely stores the service-subscriber key (IMSI) used to identify a subscriber on the mobile device. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Additionally, to identify a user's mobile device, a unique serial number called International Mobile Equipment Identity, IMEI, may be assigned to the device. The IMEI number may be used by the network to identify valid mobile devices. IMEI identifies the device, not the user (the user is identified by an International Mobile Subscriber Identity, IMSI), by a 15-digit number and includes information about the source of the mobile device, the model, and serial number. Other features of the exemplary mobile device may include front-facing and rear-facing cameras, Dolby Digital 5.1 surround sound, video mirroring and video out support, built-in speaker and microphone, built-in rechargeable lithium-polymer battery, and sensors including three-axis gyro, accelerometer, and ambient light sensor. The exemplary mobile device may also combine aGPS and other location services including Wi-Fi Positioning System and cell-site triangulation, Mobile Phone Tracking, Mobile Positioning, GMS localization, or other hybrid positioning system.

Exemplary specifications for three commercially available mobile devices are provided in the table below.

| Pixel ® 2 XL | iPhone ® X | Galaxy ® 9+ |
|---|---|---|
| OS—Android 8.0 | OS—IOS 11 | OS—Android 8.0 |
| Display—6 inches (2880 × | Display—5.8 inches (2436 × | Display—6.2 inches (2960 × |

| Pixel ® 2 XL | iPhone ® X | Galaxy ® 9+ |
|---|---|---|
| 1440 pixels) | 1125 pixels) | 1440 pixels) |
| Rear Camera—12 MP (f/1.8) | Rear Camera—Dual 12-MP (wide-angle: f/1.8, telephoto: f/2,4) | Rear Camera—12-MP Super Speed Dual Pixel (f/1.5-f/2.4), 12-MP telephoto with 2 × zoom (f/2.4) |
| Front Camera—8 MP (f/2.4) | Front Camera—7 MP (f/2.2) | Front Camera—8-MP (f/1.7) |
| CPU—Snapdragon 835 | CPU—A11 Bionic | CPU—Snapdragon 845 |
| RAM—4 GB | RAM—4 GB | RAM—6 GB |
| Storage—64 GB, 128 GB | Storage—64 GB, 256 GB | Storage—64 GB |
| Size—6.2 × 3 × 0.3 in | Size—5.7 × 2.8 × 0.3 in | Size—6.2 × 2.9 × 0.33 in |
| Weight—6.2 ounces | Weight—6.14 ounces | Weight—6.7 ounces |

Exemplary Computing Environment

In an exemplary implementation discussed further below, the present system and method operates in an environment utilizing a client device, such as the mobile device described above, in communication with a host server (e.g., cloud server) over a computer network, such as the Internet. The host server may comprise a processor and a computer readable medium, such as random access memory (RAM). The processor is operable to execute certain programs used in the present system and method for calculating, recording and reporting air pressure of a vehicle tire, and other computer program instructions stored in memory. Such processor may comprise a microprocessor (or any other processor) and may also include, for example, a display device, internal and external data storage devices, cursor control devices, and/or any combination of these components, or any number of different components, peripherals, input and output devices, and other devices. Such processors may also communicate with other computer-readable media that store computer program instructions, such that when the stored instructions are executed by the processor, the processor performs the acts described further herein. Those skilled in the art will also recognize that the exemplary environments described herein are not intended to limit application of the present system and method, and that alternative environments may be used without departing from the scope of the invention.

Various problem-solving programs incorporated into the present system and method, and discussed further herein, may utilize as inputs, data from a data storage device or location. In one embodiment, the data storage device comprises an electronic database. In other embodiments, the data storage device may comprise an electronic file, disk, or other data storage medium. The data storage device may store features of the invention applicable for performing one or more steps of a method for calculating, recording and reporting air pressure of a vehicle tire. The data storage device may also include other items useful to carry out the functions of the present system and method. In one example, the present computer programs may further comprise algorithms designed and configured to perform one or more steps of a method for calculating, recording and reporting air pressure of a vehicle tire.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Exemplary Optional Recognition Mechanical Tire Pressure Gauge

Figure 1:
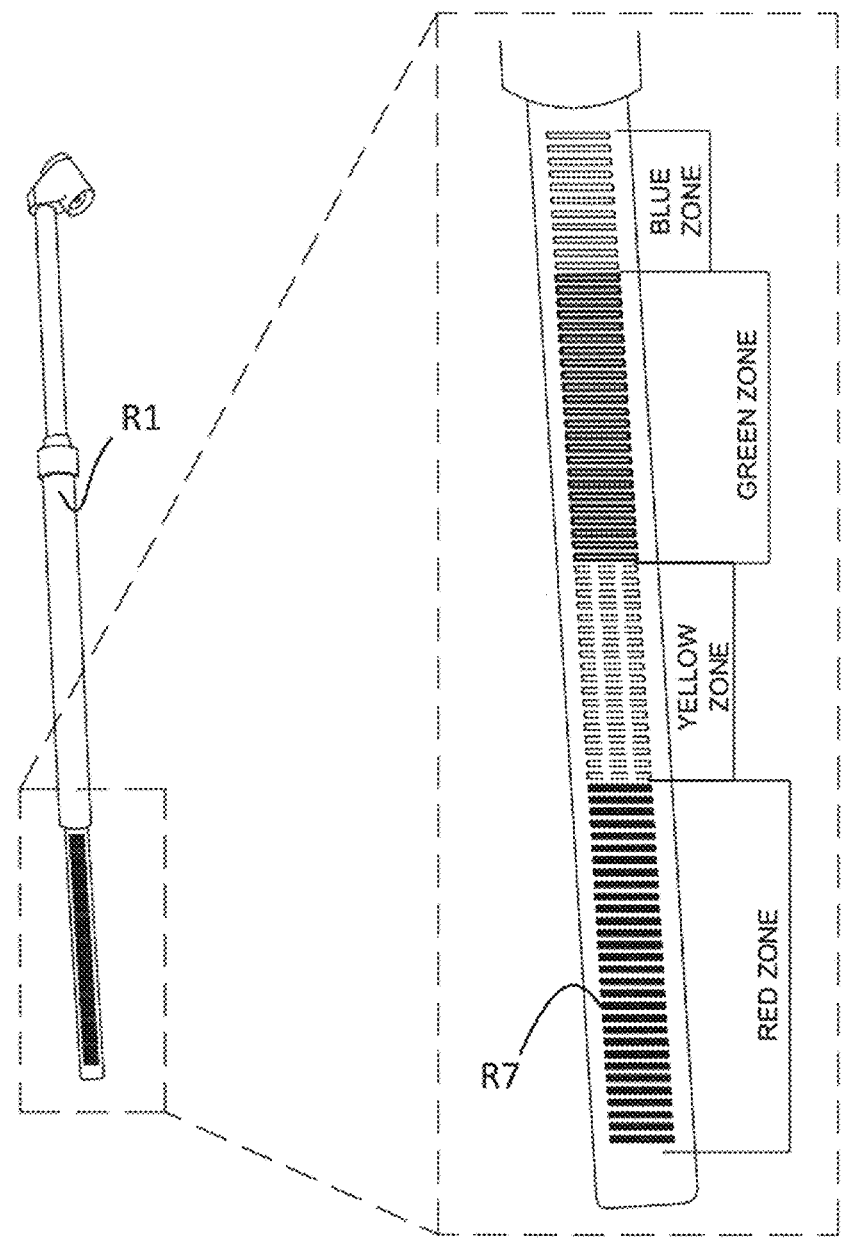
FIG. 1 is a view of a handheld pressure gauge according to one exemplary embodiment of the present disclosure.
Figure 2:
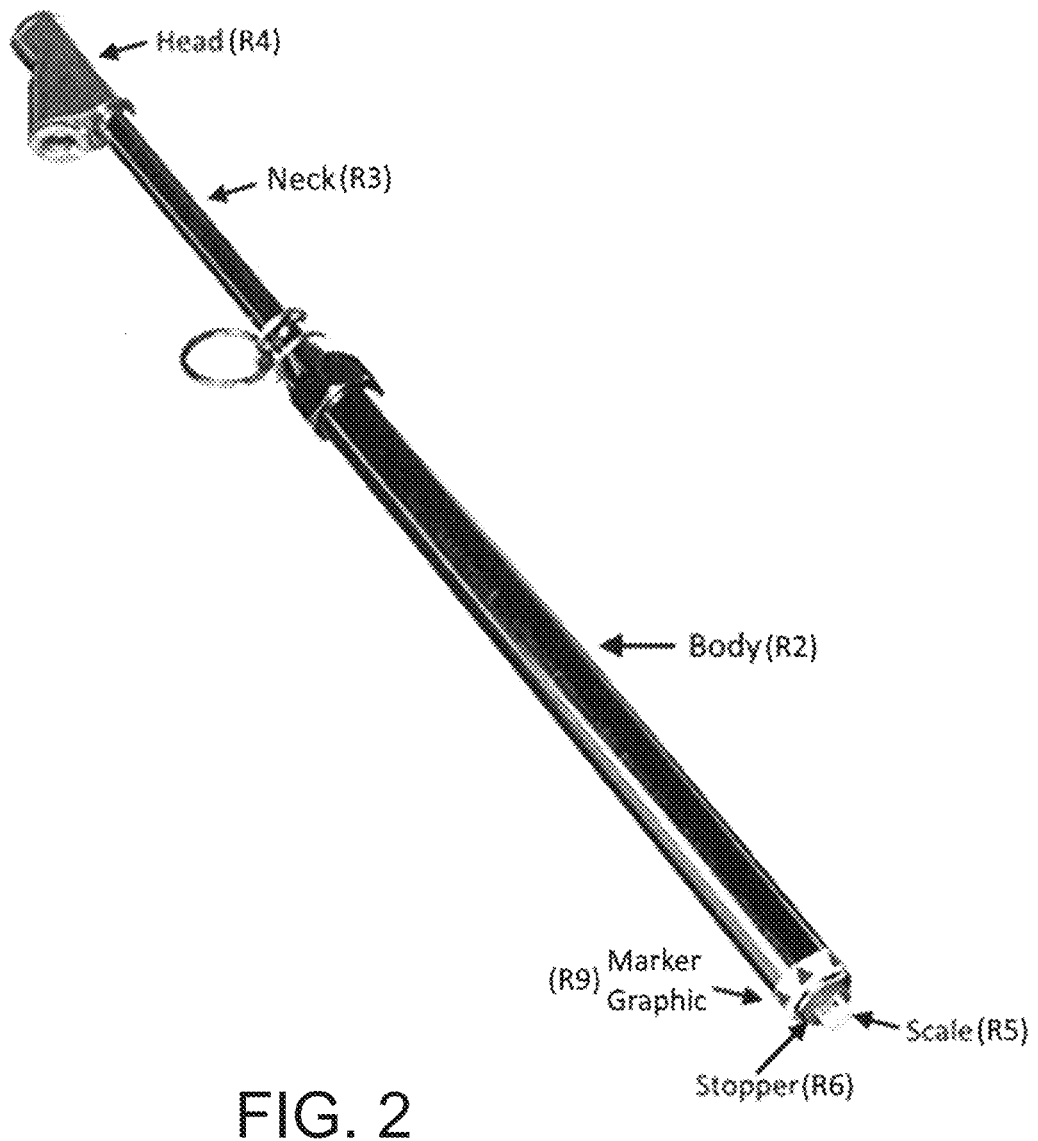
FIG. 2 is a perspective view of the exemplary handheld pressure gauge.

Referring to FIGS. 1 and 2, the exemplary handheld pressure gauge R1 comprises a tubular body section R2 joined to a narrower diameter neck section R3 which in turn connects with the gauge head R4. Held within the gauge body R2 is the measurement scale R5, which is forced out of the gauge body R2 a distance proportional with the measured air pressure. The movement of the measurement scale R5 is forced by a pneumatic piston and opposed by an internal spring. The measurement scale R5 is held in place by internal washers and a stopper R6 at the bottom opening of the gauge body R2. The measurement scale R5 includes a series of rectangular markers R7 spaced apart at regular intervals and found in groups of shared hue along the series as seen in FIG. 1.

As the measurement scale R5 is pushed farther out of the end of the gauge body R2, more markers R7 are exposed to view and can be counted by the computer vision analysis software in order to determine the pressure reading. The spacing/size of the markers R7 corresponds to the gauge's primary unit of measurement, with one revealed marker representing an incremental increase in the total measurement (e.g. one marker exposed equals 2 PSI of measured pressure). The greater the density of markers R7 on the scale, the higher the resolution of the reading that is possible for the inspection tool. Though markers R7 are sized and positioned to report a primary unit in round numbers, unit conversion can be performed on the mobile device R8 to report the measurement in the desired unit (e.g. PSI to kPa, bar, etc.).

The chief difficulty in implementing this approach is to ensure that the measurement scale R5 is brought into focus by the device R8 camera. If the entire scale R5 must be analyzed, as is the case for high pressures where a large portion of the scale R5 is exposed to view, then a large proportion of the overall image will be composed of the background area. This high background area to subject area ratio can lead the camera to automatically adjust its focal length to the background depth. This can be combatted by adding several groups of different colored/shaped markers R7 to correspond with their respective pressure regions. For example, 0-25 psi markers could be represented in red, 26-50 psi markers in yellow, and 51-75 psi markers in green, etc. These groups can be leveraged to enable the user to capture only a portion of the measurement scale R5 while still providing the information necessary for the computer vision analysis software to output the desired tire pressure reading. This is accomplished by having the user capture only the region representing the highest pressures. For example, a pressure of 33 psi is measured, meaning that the entire red region (0-25 psi) and a portion of the yellow region (26-50 psi) are exposed to view. Instead of placing the entire measurement scale R5 into the camera view, the user can draw the subject closer to the camera and capture a close up of the region between the end of the gauge body R2 and the top-most red marker R7. This image would include all the exposed yellow markers R7, and after counting these yellow markers R7 a pressure reading could be output, since the software is able to detect the yellow hue associated with the 26-50 psi region. The capability to capture only the highest pressure region and disregard all markers R7 in lower pressure regions becomes especially relevant in the measurement of tire pressure for commercial vehicles whose normal operating pressures can regularly exceed 100 psi.

When the gauge R1 is held at an angle, with the head of the gauge R4 (top, where gauge is pressed onto valve stem) rotated towards the user and the measurement scale R5 rotated away from the user, the camera's view can be impeded by shadowing from the gauge body R2 falling on top-most portion of the measurement scale R7. If the capture angle is extreme enough, then the gauge body R2 itself can obstruct the view. This top-most area of the measurement scale R5 is the most critical part to see clearly, as the pressure reading is determined based on the number of top-most markers R7 visible, since they are necessarily the highest pressure region exposed. In order to ensure that the camera's view of the measurement scale R5 is not obscured by the gauge body R2 when a reading is captured, a colored marker R7 is incorporated into the stopper R6 (piece at the end of the body's tube that holds the scale on center and stops it from leaving the tube, typically plastic). The colored stopper R6 must be recognized by the software's computer vision analysis in order to capture a reading. If the colored stopper R6 is not visible to the camera, then a reading should not be captured since the gauge's measurement scale R5 is not fully visible to the camera. Alternatively, a marker graphic R9 could be adhered or printed onto the end of the gauge body itself, as shown by the series of triangle markers in FIG. 2. Since the measurement scale R5 is able to rotate within the gauge body, this marker graphic R9 is repeated around the entire circumference such that the pattern is always in view no matter the orientation of the measurement scale R5. In order to combat shadowing from the gauge body R2 or other sources, even lighting can be provided by the mobile device's R8 flashlight. The photosensor commonly included in cellular phone designs is leveraged to determine the ambient lighting conditions, and this data is then used to activate or deactivate the device flashlight at predetermined ambient light thresholds.

Another marker could be positioned at the base of the measurement scale R5 which protrudes from the gauge body R2 at all times, even at zero pressure. The software could use this marker to ensure that the entire measurement scale R5 is in view of the camera when capturing pressure readings in the bottom-most pressure group (e.g. red, less than 26 psi per the earlier example). The requirement for detection of this marking is only enforced by the software when markers R7 exclusively from the bottom-most pressure region are detected.

The pressure groups defined for improved functionality of the software can also correspond with the generalized tire pressure requirements that are specified for a majority of commercial vehicle tires, or be adapted for specific fleet needs. For example, by using red markers R7 for the lowest pressure region, progressing to yellow markers R7 for the next pressure region, and green for the pressure region corresponding to acceptable tire pressures, users could see at a glance into which category their tires fell. Above the acceptable pressure level recommended by wheel and tire manufacturers for safe operation, overinflation could be indicated with markers of a color like blue. For more specific readings by the human eye without use of the computer vision analysis software, traditional lined and numbered scale markings could be printed on the opposite side of the measurement scale R5.

Figure 3:
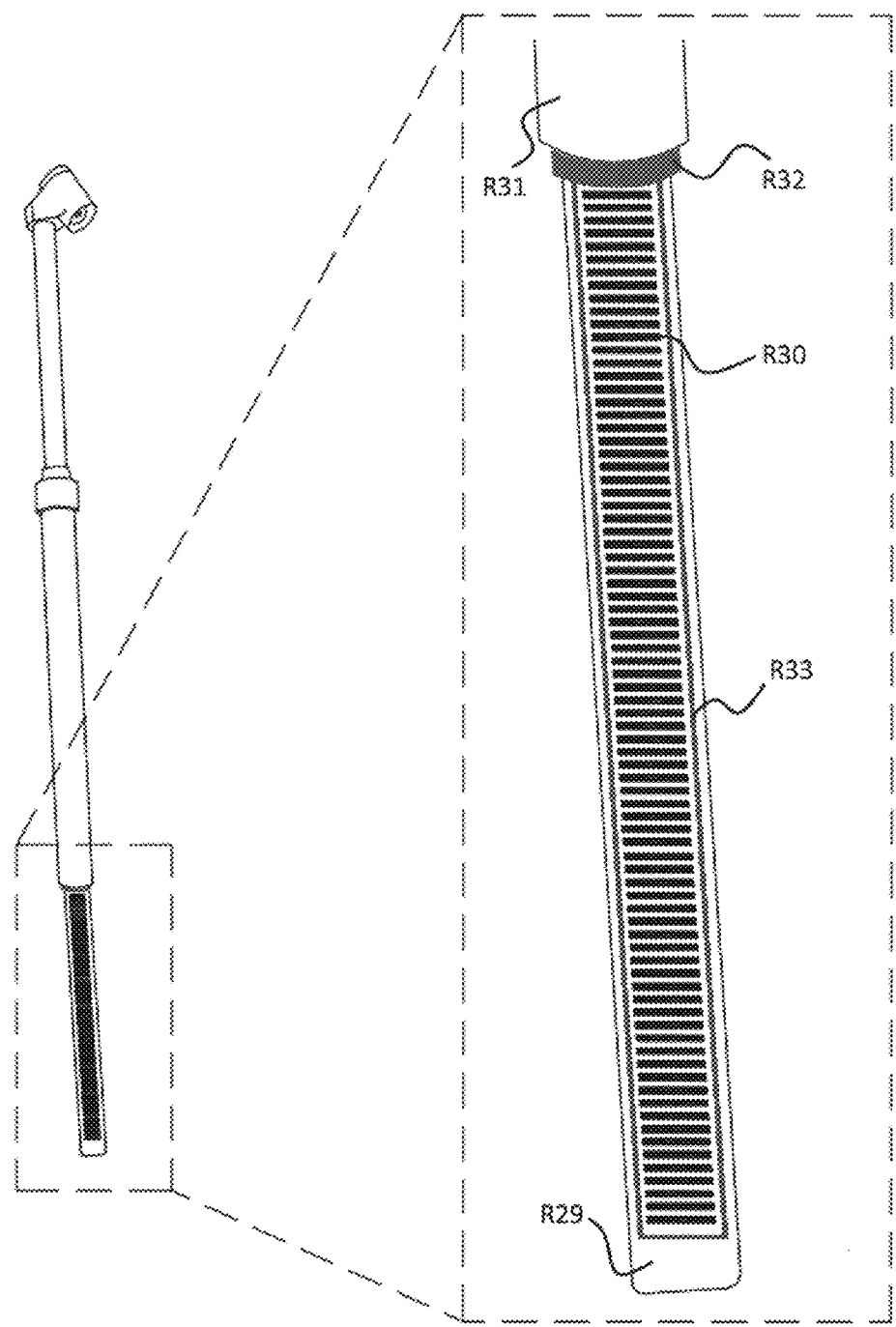
FIGS. 3 and 4 are further views of the exemplary handheld pressure gauge.

Referring to FIG. 3, computer vision analysis could be used to determine the reading shown on a pneumatic pressure gauge as follows. A scale R29 featuring a series of evenly sized and spaced markers R30 extends out of the gauge body R31 a distance proportional to the measured pressure value. The number of revealed markers R30 can be totaled by the software, and since each marker revealed represents an incremental pressure increase (e.g. 2 psi each), the pressure can be calculated, recorded and reported to the user. The computer vision analysis software limits its examination to the Region of Interest (ROI). The ROI is defined by a monochromatic border encompassing all exposed markers R30. This border is composed of two intersecting pieces of the same hue: the colored stopper R32 protruding from the gauge body R31 and the printed outline R33 surrounding the markers R30 on the scale R29. At any positive non-zero pressure measurement position, the scale R29 will extend out of the gauge body R31 such that the printed outline R33 will visually intersect with the colored stopper R32. Since these two elements are of sufficiently similar hue, the computer vision analysis software is able to detect a single closed figure surrounding the markers R30. Further computer vision analysis can be carried out on the captured area inside this figure and in this way extraneous visual data from outside the ROI can be disregarded. This process is especially useful as falsely detected markers outside of the ROI of the gauge scale R29 are not able to artificially inflate the reported measurement.

Figure 4:
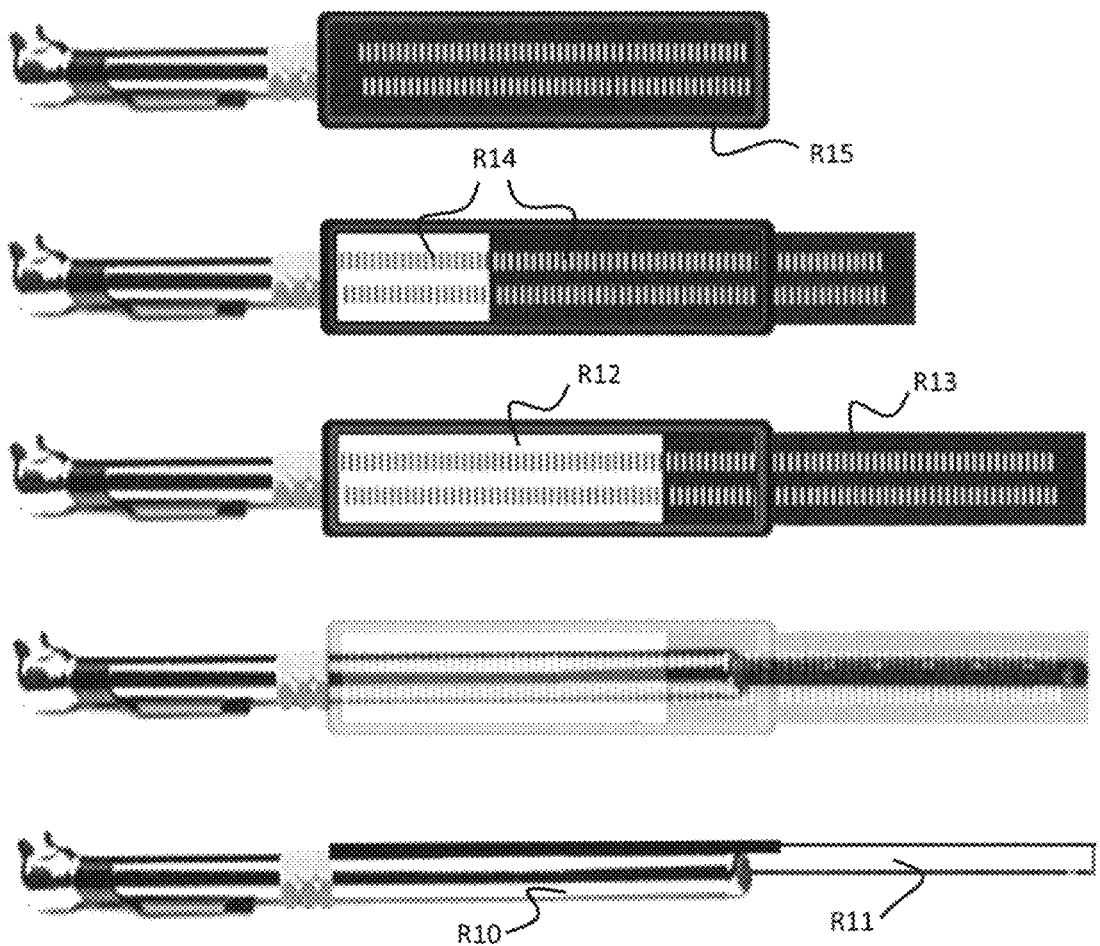

Referring to FIG. 4, another embodiment could be configured for retrofit install onto the exterior of traditional pressure gauges. An add-on device for off the shelf pneumatic pressure gauges affixes to the body R10 of the gauge and links to the existing scale R11 in order to add computer vision analysis functionality. The add-on device is composed of a fixed piece R12 which is fully hidden at zero pressure and a movable piece R13 which slides over top of the fixed piece to reveal its markers R14 to view at non-zero pressure readings. A border R15 around the measurement area of these two pieces defines a Region of Interest (ROI) detectable by the computer vision analysis software. Once the ROI is detected, the software crops out image data from outside the region and analyzes the markers R14 found within. The computer vision analysis software is capable of differentiating attributes such as the hues, relative size, orientation, shape, and whether or not the figure is closed/open. Using these defining features, markers R14 can be identified and categorized which enables inspection readings to be calculated based upon the ratio of markers R14 of different types detected. The total number of markers R14 detected can be used as a check to determine that a valid reading has been captured.

Exemplary System Software

Figure 5:
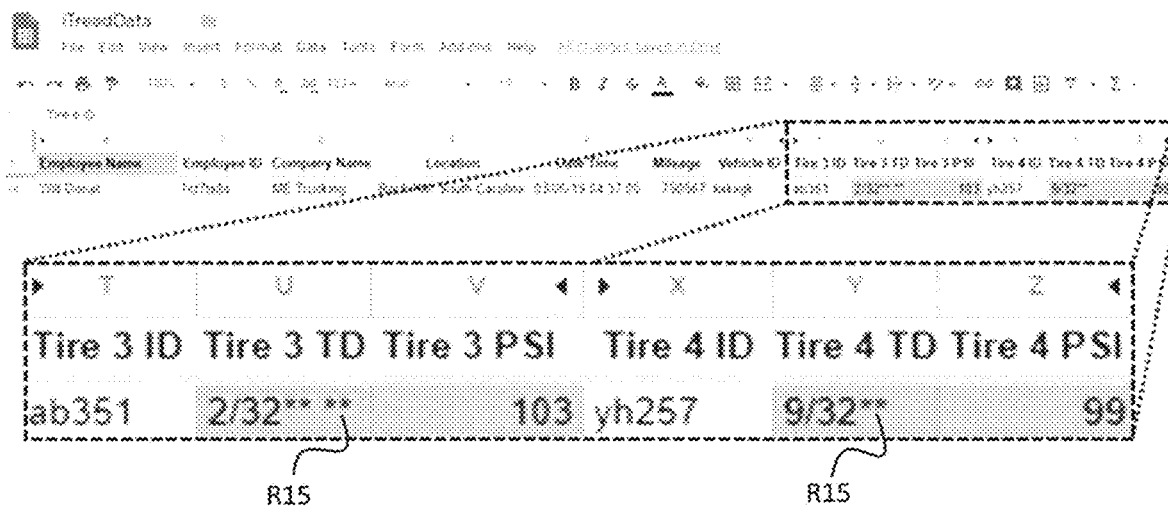
FIG. 5 is a view illustrating exemplary data displayed on a user's computing device.
Figure 6:
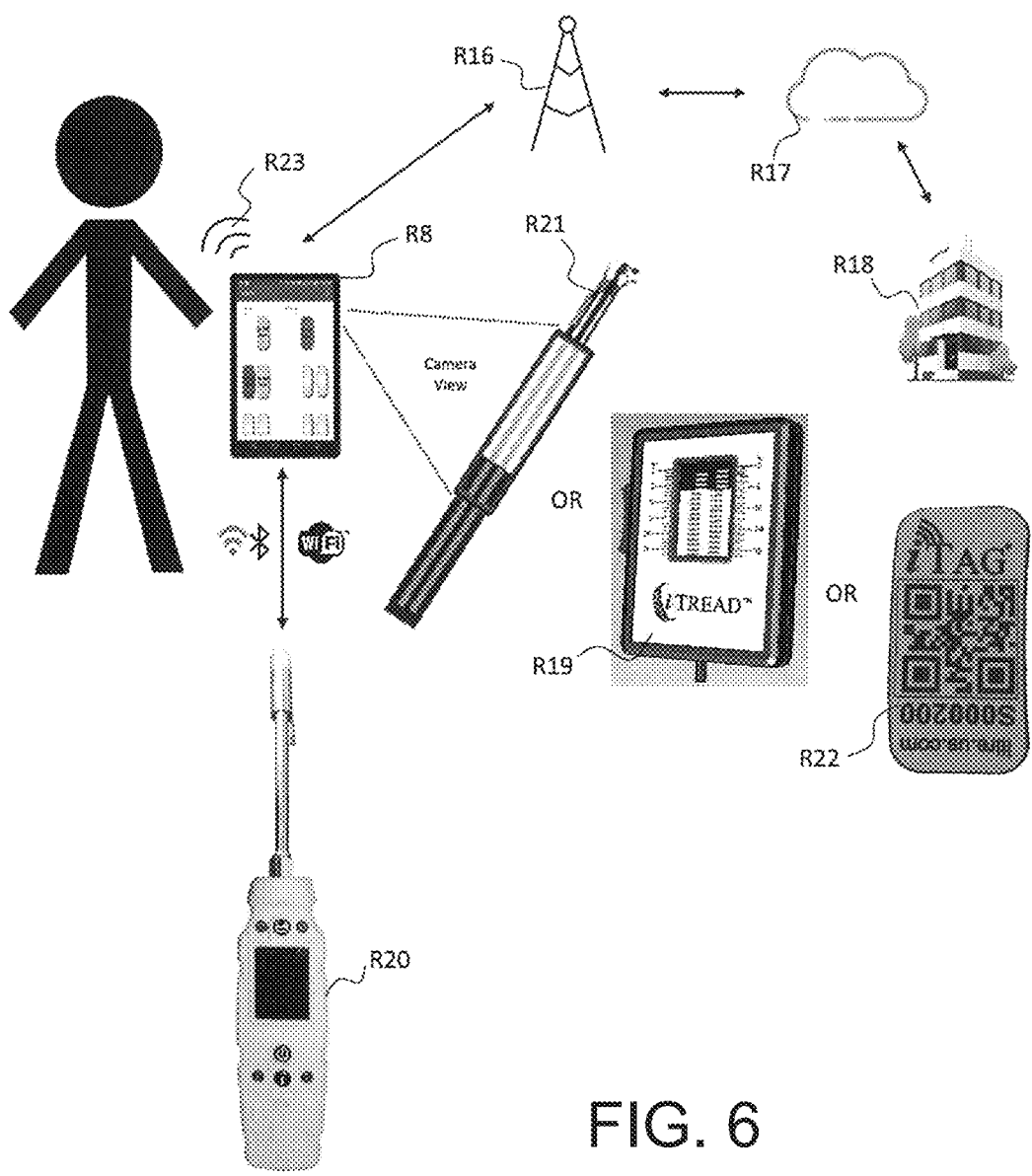
FIG. 6 is a diagrammatic view illustrating various exemplary devices of the present disclosure.

Referring to FIGS. 5 and 6, the computer vision analysis software used to read various instruments could be incorporated into an inspection application for a mobile device R8 such as a cellular phone, tablet, or Electronic Logging Device (ELD). Inspections are a mandated part of commercial vehicle operation per CSA 2010 (Title 49, Subtitle B, Chapter III, Subchapter B, Part 392.7) and as such, the record keeping of inspections can be valuable to vindicate drivers and carriers in the event of an accident or citation. All inspection information gathered by compatible tools can be recorded in the device memory and uploaded via cellular R16 or WiFi data connection to cloud storage R17 for review and analysis in the back-office R18 using services such as Google Sheets as shown in FIG. 5. This example online spreadsheet service is part of the Google Cloud® and such a backend system could provide easy access to gathered inspection data in an easy to process format. In addition to tire pressure, vehicle data concerning tread depth, battery health, lighting function, mirror condition, brake function, and other general vehicle conditions could be collected and reported by inspectors through the inspection application.

Tools used to collect this information could include the iTREAD™ depth measurement tool R19, iTIRE® Electronic pressure gauge R20, and the iTIRE® Mechanical pressure gauge R21. Not only readings from the compatible instruments, but data like GPS location, date, time, inspection duration, inspection path/sequence, user ID, user biometrics (fingerprint, facial recognition, EKG pattern, etc.), vehicle/tire/equipment ID, and defect photographs can be captured by the mobile device R8 and submitted as part of the inspection report. Asset identification information could be obtained by the mobile device R8 by scanning the Quick Read (QR) or bar code of the iTAG™ label R22 found on the device being inspected (e.g. tire, vehicle, battery, etc.). The inspection application could also indicate to the user and back-office R18 less obvious problems, such as tread depth or tire pressure mismatches between dual tire pairs which can cause further uneven wear and lead to eventual blowouts. A tread depth differential of greater than 2/32s of an inch or a pressure differential of greater than 10 psi can lead to this uneven wear occurring. For example, this tread depth mismatch condition is indicated between Tire 3 and Tire 4 in the cloud spreadsheet shown in FIG. 5 with asterisks in the tread depth fields R15. The inspection application could issue to the user written or spoken warnings/instructions R23 in response to conditions found during the inspection as shown in FIG. 6. For example, during a tire pressure inspection, feedback could be given on screen and/or spoken R23 such as: Tire Pressure Low, Tire Pressure High, or Tire Pressure OK.

Providing the user with a virtual template displayed on the mobile device screen showing the desired positioning of the measurement scale on the screen could help improve the new user experience. The template would provide a reference to guide the user's positioning of the gauge for reading capture.

Alternative Exemplary Embodiments

Figure 7:
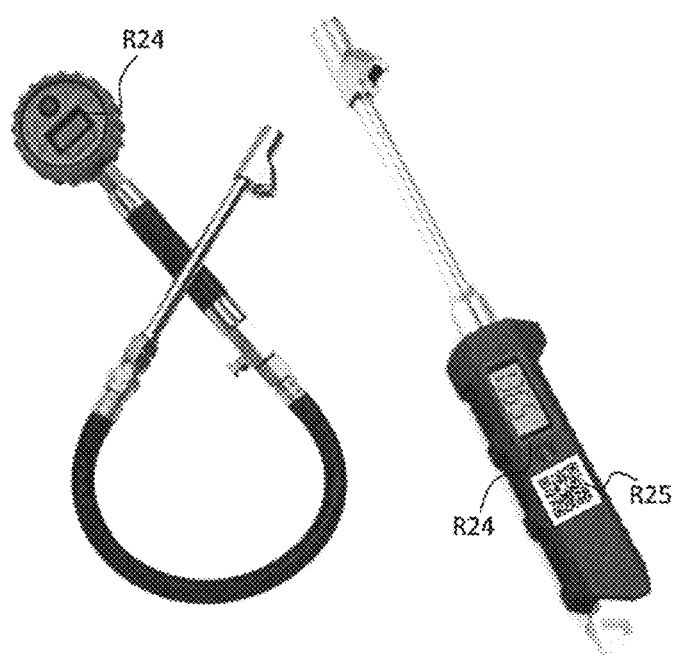
FIGS. 7, 8 and 9 illustrate other exemplary devices of the present disclosure.

Referring to FIG. 7, Optical Character Recognition (OCR) could be used alongside computer vision analysis methods to record the pressure reading from a gauge with a traditional lined and numbered scale. This approach would allow for precise human readable and machine readable functionality both from one uniform measurement scale. The addition of human readable markings alongside the markers for computer vision analysis would be another approach to accomplish the same goal. OCR technology could be used to read from a tire pressure gauge with a digital display like those shown in FIG. 7. In this way readings from an off-the-shelf tire pressure gauge with a digital display could be captured by the device camera and imported into the inspection report. Modifying the digital gauges to add a computer vision analysis recognizable border R24 around the display, used to define an ROI, has the potential to increase the speed and reliability of the acquisition of OCR readings.

Markings such as bar codes or QR codes R25 could be added to the gauge to help the software identify which type of inspection tool is being presented to the software. Alternatively, image recognition algorithms could be incorporated into the software to recognize compatible tools based upon their form-factor, color, etc. Inspection tools measuring values such as tread depth, brake stroke length, brake wear, spark plug gap, wheel alignment, and other data in a similar manner could be incorporated into the same software to deliver a more complete inspection report. Multifunction inspection tools incorporating multiple measurement functions such as both tire tread depth and tire pressure could be designed with scales compatible with the computer vision analysis software. Not only vehicle inspections tools, but other gauges such as micrometers, protractors, thermometers, mass scales, spectrometers, tachometers, speedometers, flow meters, and decibel meters could be adapted to be read by computer vision analysis and have their results quickly saved in record keeping software.

Figure 8:
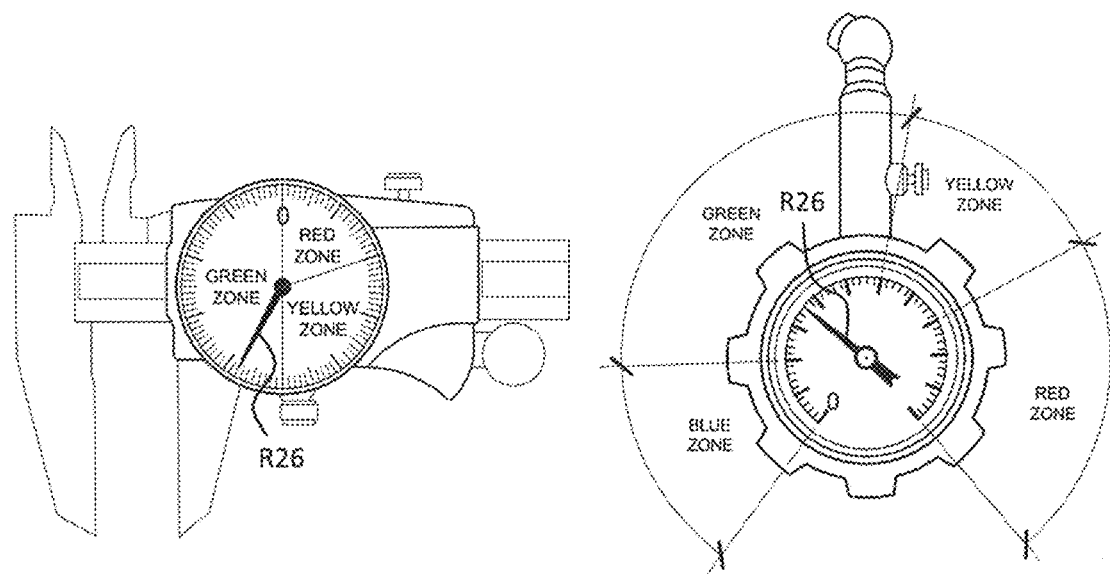

Referring to FIG. 8, the zones of a dial gauge such as those found on certain pressure gauge and micrometer designs, could be adapted for processing by computer vision analysis to output the value displayed on the face, or more broadly which zone that measurement falls into. By adding different groups of markers radially around the face and using the indicator R26 to hide one or more of these markers from view, the computer vision analysis software could determine which zone has fewer markers detected than expected and output the zone into which the measurement falls. Potentially, the software could determine precisely which marker was blocked to output a discrete measurement value. If these zones were composed of a solid fill color, then the computer vision analysis software could also determine the measured zone based upon the decrease in observed area of the zone obstructed by the indicator R26.

Figure 9:
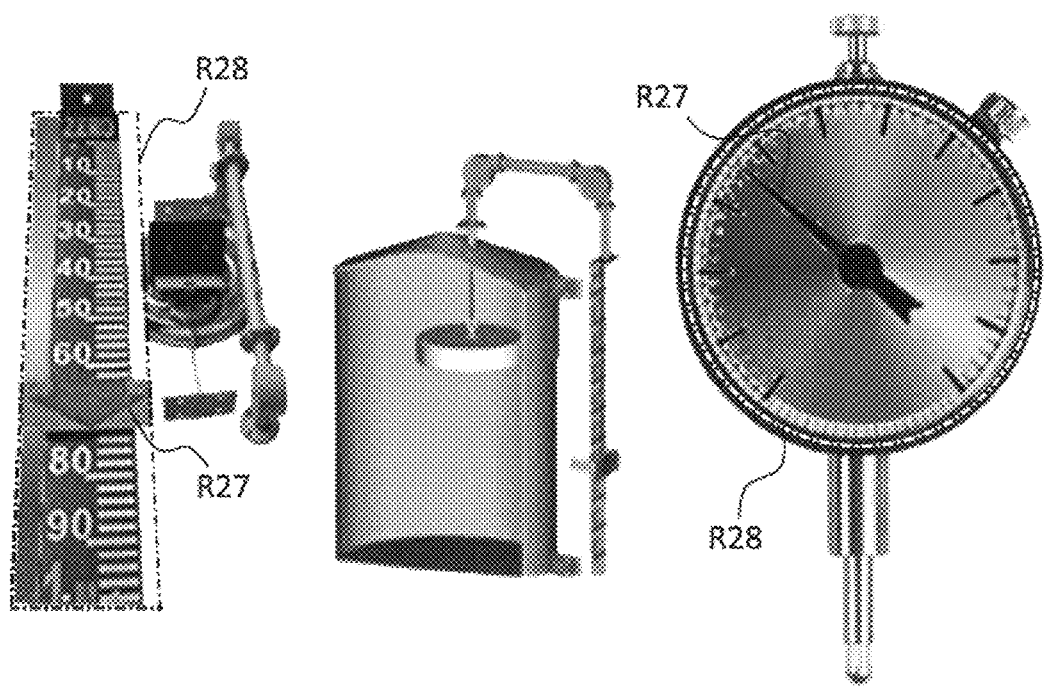
Figure 10:
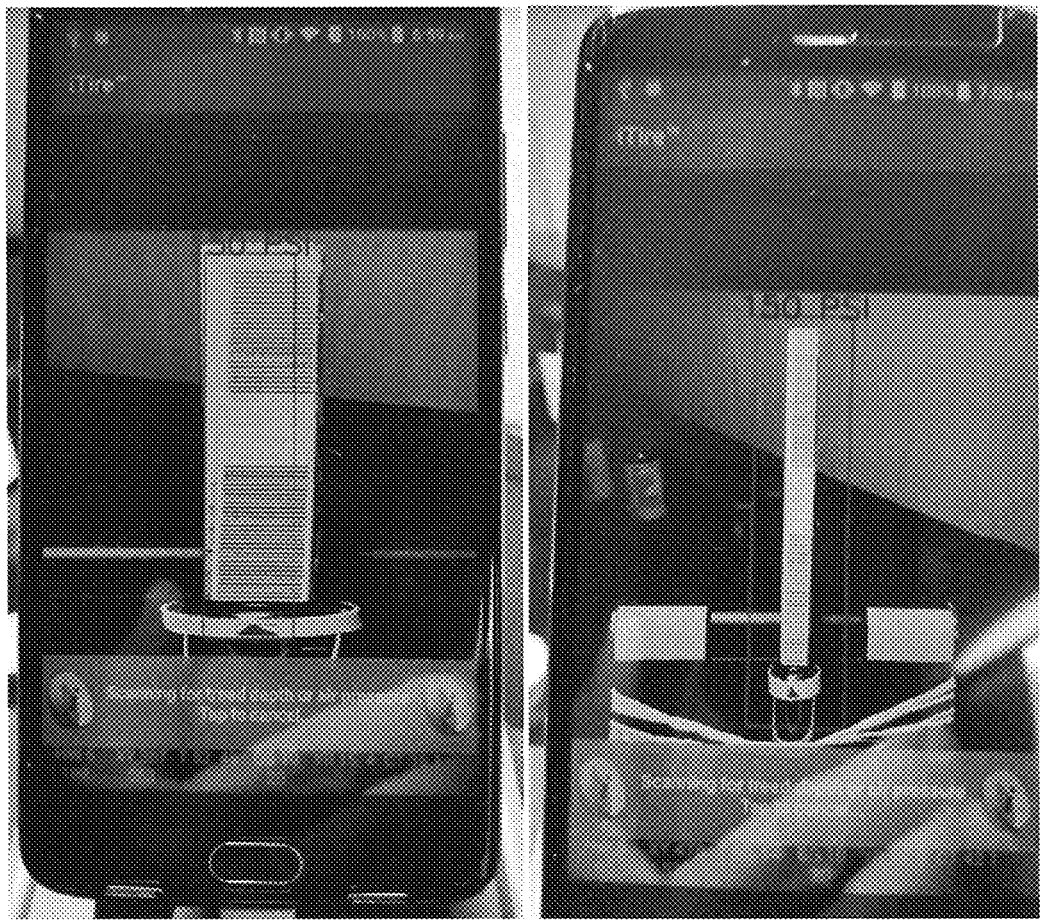
FIGS. 10, 11 and 12 demonstrate use of the exemplary handheld pressure gauge.

Discrete values on a dial or level gauge as seen in FIG. 9 could be obtained by marking the background area with a spectrum of colors in a gradient. The indicator R27 blocks a certain section of this spectrum and computer vision analysis is used to determine which section of the spectrum is not observed within the ROI R28. This defines the positioning of the indicator R27, and therefore the output value of the measurement instrument has been determined.

Figure 11:
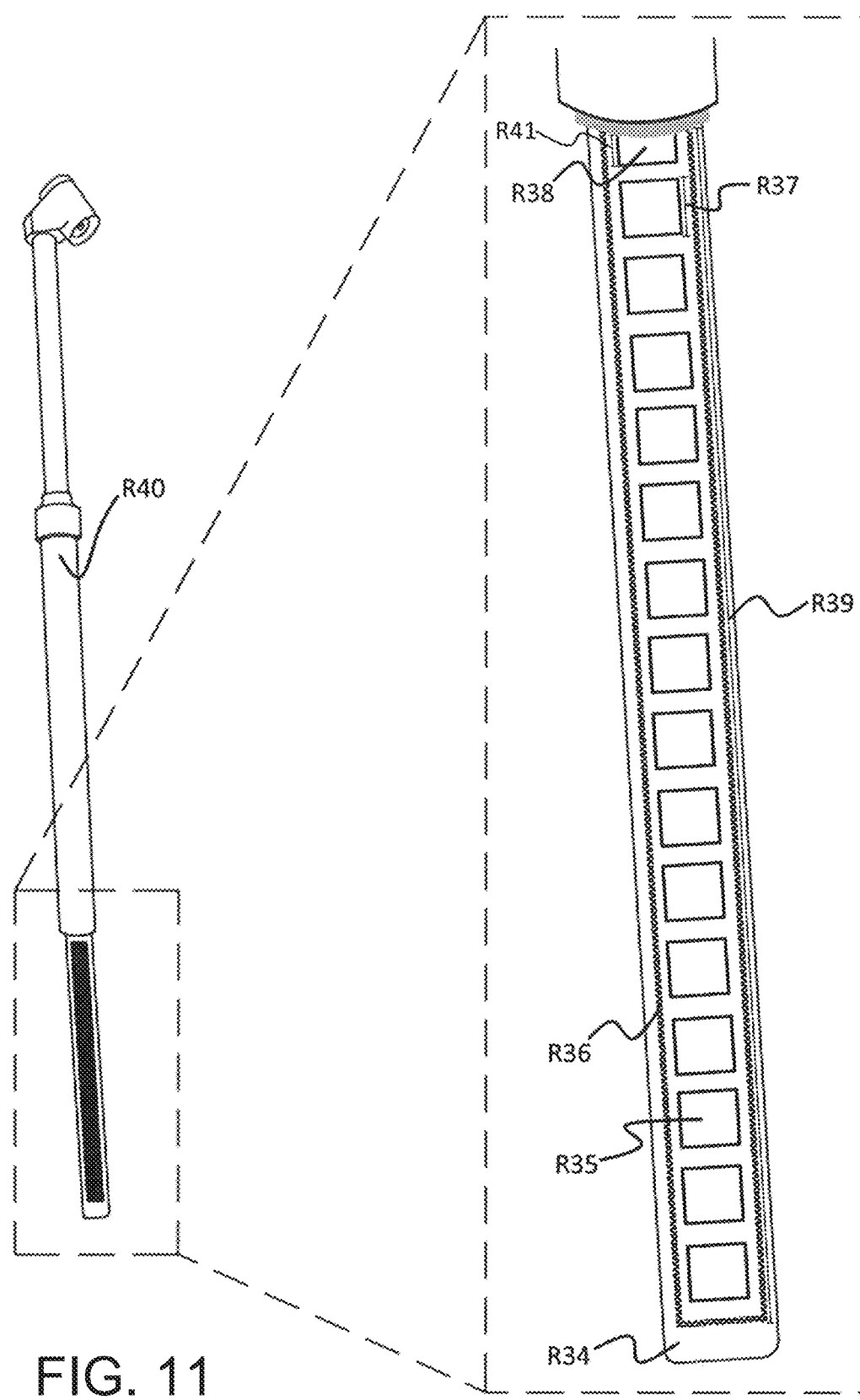

Another exemplary embodiment of the invention combines two pressure measurement methods that help validate each other by comparing the returned values. Referring to FIG. 11, the scale R34 is marked with a series of reference markers R35 surrounded by an outline rectangle R36. Computer vision analysis is used to recognize these visual features and to count the pixels composing the boundaries of both the reference markers R35 and the outline rectangle R36. The spacing and physical dimensions of the series of reference markers R35 is a known variable in the computer vision analysis inspection software, and it can calculate a ratio of distance per pixel for the side length of each reference marker detected R37. The value of this ratio found for each reference marker R35 (excluding the smallest detected reference marker R38, which can be assumed to be only partially revealed from the gauge) is then averaged together to produce an average ratio of distance per pixel.

The outline rectangle R36 is also detected and measured by the computer vision analysis software and a pixel count for its side length R39 is determined. The pixel count of the outline rectangle side length R39 is multiplied by the average ratio of distance per pixel determined from the reference markers R35 in order to output the distance value for the side length R39. The ratio of pressure per distance of scale displacement is a known constant in the software based on the positioning of graphics on the scale R34, and therefore the pressure measurement can be determined by multiplying this ratio by the distance value calculated for the side length of the outline rectangle. This calculated pressure value will be compared to a second calculated pressure value produced using a second measurement method.

The second concurrent measurement method is carried out using only the reference markers R35. As the scale R34 slides out of the pressure gauge, an increasing number of reference markers R35 are revealed and can be detected by the computer vision analysis software. Because they are placed at regular intervals on the scale, the pressure value associated with each fully revealed reference marker R35 detected is a constant known by the computer vision analysis inspection software. When only part of a reference marker R38 is revealed from the end of the pressure gauge body R40, it is still detected and its dimensions measured in pixels. The number of pixels found in the side length R41 of this smallest reference marker is divided by the average side length in pixels of the other detected reference markers. The resulting fraction is added to the number of other reference markers R35 detected and this sum is multiplied by the pressure constant to yield a pressure value. Due to pressure gauge designs which do not measure pressures below a minimum value (commonly 10 psi), a constant value may need to be added to this calculated pressure value for accurate results.

Figure 12:
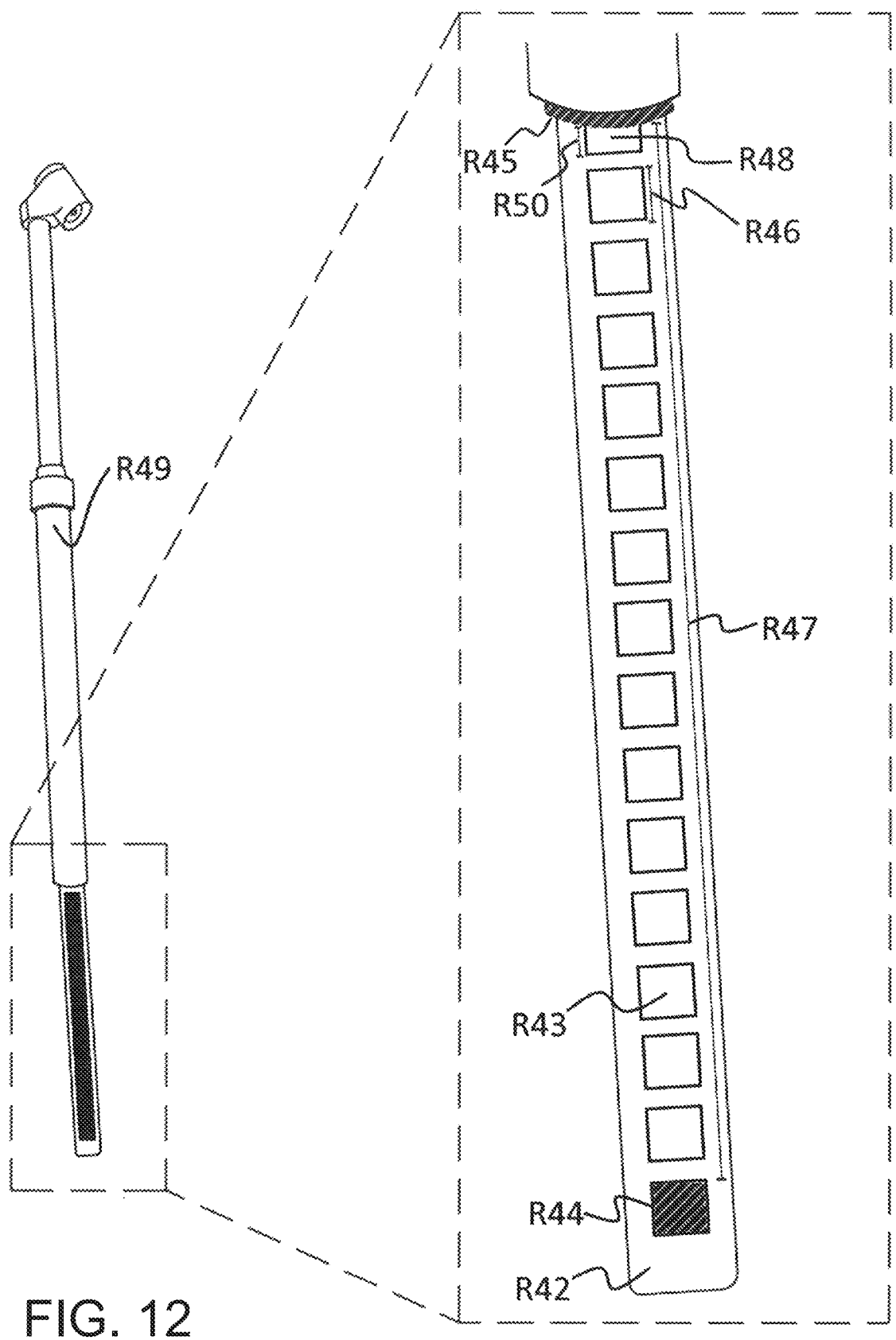

Another implementation of a dual measurement validation method is shown in FIG. 12. The scale R42 is marked with a series of reference markers R43 and a visually differentiated end marker R44 with distinct color, shape, or other feature. In this implementation, the stopper R45 bears the same visual differentiation as the end marker R44. Computer vision analysis is used to recognize these visual features R43 R44 R45 and to count the number of contiguous pixels composing the side length R46 of the reference markers R43 and to count the number of contiguous pixels between the end marker R44 and stopper R45 which is the measurement length R47. The spacing and physical dimensions of the series of reference markers R43 is a known variable in the computer vision analysis inspection software. Therefore, the ratio of distance per pixel can be calculated for the side length R46 of each reference marker detected. The value of this ratio found for each reference marker R43 (excluding the smallest detected reference marker R48, which can be assumed to be only partially revealed from the gauge) is then averaged together to produce an average ratio of distance per pixel.

The number of contiguous pixels composing the measurement length R47 is measured by the computer vision analysis software. This pixel count is multiplied by the average ratio of distance per pixel determined from the reference markers R43 in order to output the distance value for the measurement length R47. The ratio of pressure per distance of scale displacement is a known constant in the software based on the positioning of graphics on the scale R42, and therefore the pressure measurement can be determined by multiplying this ratio by the distance value calculated for the measurement length R47. This calculated pressure value will be compared to a second calculated pressure value produced using a second measurement method.

The second concurrent measurement method is carried out using only the reference markers R43. As the scale R42 slides out of the pressure gauge, an increasing number of reference markers R43 are revealed and can be detected by the computer vision analysis software. Because they are placed at a regular interval on the scale, the pressure value associated with each fully revealed reference marker R43 detected is a constant known by the computer vision analysis inspection software. When only part of a reference marker R48 is revealed from the end of the pressure gauge body R49, it is still detected and its dimensions measured in pixels. The number of pixels found in the side length R50 of this smallest reference marker is divided by the average side length in pixels of the other detected reference markers. The resulting fraction is added to the number of other reference markers R43 detected and this sum is multiplied by the pressure constant to yield a pressure value. Due to pressure gauge designs which do not measure pressures below a minimum value (commonly 10 psi), a constant value may need to be added to this calculated pressure value for accurate results.

Computer vision analysis relies upon the quality of input data from the imaging sensor. Improper lighting conditions, focus, glare, or other optical phenomena can significantly distort or degrade the quality of data from the image being analyzed. For example, a series of the closely spaced reference markers R43 in FIG. 12 can appear blurred/merged together into a single marker if the imaging sensor's focal depth does not coincide with the positioning of the scale R42. However, if enough other reference markers R43 or other visual features of the system (R44, R45, R48) are detected by the computer vision analysis software, then an error correction method can be applied to extrapolate the pressure measurement shown. If a reference marker side length R46 is measured that is greater than or equal to twice the next largest side length R46, and there are at least three reference markers R43 detected, then it can be assumed that multiple reference markers have been merged together in the image being analyzed. The dimensions and spacing for each reference marker R43 is a known constant parameter. The positioning and size of the largest detected reference marker R43 in relation to the other detected reference markers can be used to extrapolate how many reference markers R43 have been merged together. This information can then be used to output a pressure measurement calculated using the side length measurement R46 of the non-merged reference markers R43 to determine the image's distance per pixel ratio.

Figure 13:
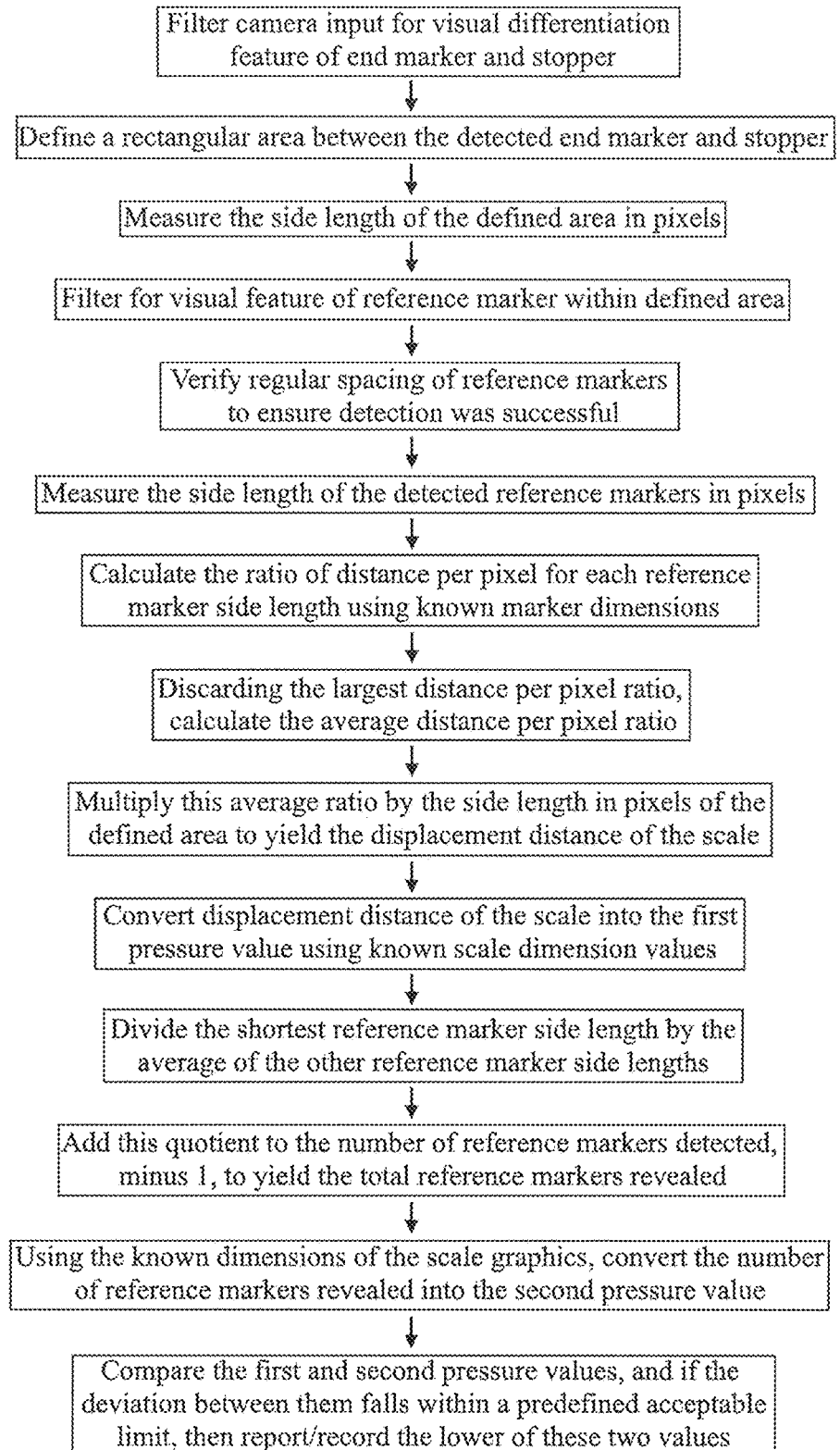
FIG. 13 is a block diagram demonstrating operation of the exemplary handheld pressure gauge.

FIG. 13 is a flow chart detailing a procedure for digitally reading a pressure measurement from the pressure gauge depicted in FIG. 12.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention.

What is claimed:

1. A handheld pneumatic tire pressure gauge comprising:
   a substantially hollow tubular body section having a gauge head at one end thereof configured to operatively connect to a pneumatic tire and an open end opposite said gauge head;
   an elongated measurement scale slidably positioned within said body section and configured to be forced out of said body section through said open end a distance proportional with a measured air pressure;
   wherein said measurement scale comprises a series of markers spaced apart at intervals and arranged in a plurality of zones along a length thereof, and wherein said plurality of zones are arranged end to end along a common side of said measurement scale such that each zone extends in a lengthwise direction of said measurement scale, and wherein all markers within a first zone comprise a first hue and wherein all markers in an adjacent second zone comprise a second hue distinct from said first hue; and
   a stopper located at the open end of said tubular bod and an end marker located at a distal end of said elongated measurement scale and wherein said stopper and said end marker comprise the same markings adapted for electronic reading by computer vision analysis inspection software to determine a length of said measurement scale extending from said stopper to said end marker.

2. The handheld pneumatic tire pressure gauge according to claim 1, wherein said first hue is selected from a group consisting of red, yellow, green and blue.

3. The handheld pneumatic tire pressure gauge according to claim 1, wherein said second hue is selected from a group consisting of red, yellow, green and blue.

\* \* \* \* \*